United States Patent
Lafer et al.

(10) Patent No.: US 12,289,186 B2
(45) Date of Patent: Apr. 29, 2025

(54) TRANSCEIVER

(71) Applicant: NXP B.V., Eindhoven (NL)

(72) Inventors: Manuel Lafer, Ottendorf (AT); Wolfgang Küchler, Graz (AT)

(73) Assignee: NXP B.V., Eindhoven (NL)

( * ) Notice: Subject to any disclaimer, the term of this patent is extended or adjusted under 35 U.S.C. 154(b) by 385 days.

(21) Appl. No.: 18/047,810

(22) Filed: Oct. 19, 2022

(65) Prior Publication Data

US 2023/0133494 A1    May 4, 2023

(30) Foreign Application Priority Data

Oct. 29, 2021   (EP) ...................................... 21205573

(51) Int. Cl.
| | | |
|---|---|---|
| *H04L 25/02* | (2006.01) | |
| *H04B 1/40* | (2015.01) | |
| *H04L 27/00* | (2006.01) | |

(52) U.S. Cl.
CPC ........... *H04L 27/0014* (2013.01); *H04B 1/40* (2013.01); *H04L 25/0212* (2013.01); *H04L 2027/0026* (2013.01)

(58) Field of Classification Search
CPC ......... H04B 1/40; H04B 7/086; H04L 1/1685; H04L 12/403; H04L 12/423; H04L 27/0014; H04L 25/0212; H04L 49/254; H04L 2027/0016; H04L 2027/0026; G01S 1/0428; G01S 3/023; G01S 3/46; G01S 13/20; G01S 13/765; G01S 13/767; G01S 13/785; H01Q 5/25; H04W 74/06

See application file for complete search history.

(56) References Cited

U.S. PATENT DOCUMENTS

| | | | | |
|---|---|---|---|---|
| 10,488,509 | B2* | 11/2019 | McLaughlin | ......... G01S 13/765 |
| 10,491,266 | B2* | 11/2019 | McLaughlin | ...... H04B 1/71637 |
| 11,128,342 | B2* | 9/2021 | McLaughlin | ............. G01S 5/12 |
| 11,137,491 | B2* | 10/2021 | Kim | ...................... H04W 76/40 |
| 2012/0276921 | A1 | 11/2012 | Nemeth | |
| 2014/0269389 | A1 | 9/2014 | Bukkfejes et al. | |
| 2017/0227623 | A1 | 8/2017 | Park et al. | |
| 2018/0167150 | A1 | 6/2018 | Clancy et al. | |
| 2018/0206075 | A1 | 7/2018 | Demirdag et al. | |
| 2018/0254870 | A1 | 9/2018 | Dutz et al. | |
| 2020/0150262 | A1* | 5/2020 | Kim | ...................... H04W 76/40 |
| 2020/0183000 | A1* | 6/2020 | Li | ......................... H04W 4/023 |
| 2022/0166649 | A1 | 5/2022 | Lafer et al. | |

OTHER PUBLICATIONS

Heydariaan et al., Toward Standard Non-line-of-sight Benchmarking of Ultra-wideband Radio-based Localization, IEEE, 6 pages, 2018.*

Corbalan et al., Ultra-wideband Concurrent Ranging, arXiv, 40 pages, Jul. 21, 2020.*

(Continued)

*Primary Examiner* — Frank Duong

(57) ABSTRACT

A transceiver configured to: determine a reference frequency offset relative to a second transceiver based on double sided ranging; correct first and second portions of a packet received from a respective first and second antenna; and determine an angle of arrival of the packet based on corrected first and second portions and the reference frequency offset.

20 Claims, 7 Drawing Sheets

(56) References Cited

OTHER PUBLICATIONS

Corbalan et al., Concurrent Ranging in Ultra-wideband Radios: Experimental Evidence, Challenges, and Opportunities, International Conference on Embedded Wireless Systems and Networks (EWSN), Madrid, Spain, 12 pages, Feb. 14-16, 2018.*

Kumar, S., "Doa Estimation of IR-UWB Signals using Coherent Signal Processing", 2014 IEEE 10th International Colloquium on Signal Processing & its Applications (CSPA2014), Mar. 7-9, 2014.

Mani, V.V., "Direction of Arrival Estimation and Beamforming of Multiple coherent UWB Signals", 2010 IEEE International Conference on Communications, May 23-27, 2010.

IEEE Standards Association, "802.15.4z-2020-IEEE Standard for Low-Rate Wireless Networks—Amendment 1: Enhanced Ultra Wideband (UWB) Physical Layers (PHYs) and Associated Ranging Techniques", Aug. 25, 2020.

U.S. Appl. No. 17/822,607, filed Aug. 26, 2022, entitled Method, Device and System for Verifying UWB Ranging Results.

\* cited by examiner

TRANSCEIVER

CROSS-REFERENCE TO RELATED APPLICATIONS

This application claims the priority under 35 U.S.C. § 119 of European Patent application no. 21205573.5, filed on 29 Oct. 2021, the contents of which are incorporated by reference herein.

FIELD

The present disclosure relates to a transceiver for determining an angle of arrival of received signalling.

SUMMARY

According to a first aspect of the present disclosure there is provided a transceiver for calculating an angle of arrival of received signalling, the transceiver configured to:
  receive a polling packet from a second transceiver, the polling packet indicating a polling packet transmission time;
  transmit a response packet to the second transceiver in response to receiving the polling packet;
  receive a second packet from the second transceiver following transmission of the response packet, the second packet indicating a second packet transmission time;
  determine a reference frequency offset between a local oscillator of the transceiver and a local oscillator of the second transceiver based on the polling packet transmission time, a polling packet arrival time, the second packet transmission time and a second packet arrival time, and a nominal carrier frequency;
  wherein the transceiver comprises a receive path configured to:
    receive a first portion of an angle of arrival packet of the received signalling from a first antenna;
    enable a tracking module to determine a first frequency offset and/or a first phase offset of the first portion;
    correct the first portion based on the first frequency offset and/or the first phase offset to provide a first corrected signal;
    determine a first carrier phase based on the first corrected signal;
    disable the tracking module;
    receive a second portion of the angle of arrival packet of the received signalling from a second antenna;
    correct the second portion based on the first frequency offset and/or the first phase offset to provide a second corrected signal;
    determine a second carrier phase based on the second corrected signal and the reference frequency offset; and
    determine an angle of arrival of the angle of arrival packet based on the first carrier phase and the second carrier phase.

In one or more embodiments, the angle of arrival packet may comprise the polling packet or the second packet.

In one or more embodiments, the transceiver may be configured to determine the reference frequency offset based on a difference between the second packet transmission time and the polling packet transmission time, divided by a difference between the second packet receipt time and the polling packet receipt time.

In one or more embodiments, the transceiver may be configured to measure the polling packet receipt time and the second packet receipt time with respect to the local oscillator of the transceiver. The polling packet transmission time and the second packet transmission time indicated in the respective polling packet and second packet, may comprise times measured with respect to the local oscillator of the second transceiver.

In one or more embodiments, the transceiver may be further configured to transmit the reference frequency offset to the second transceiver.

In one or more embodiments, the receive path may be configured to: correlate each of the first corrected signal and the second corrected signal with an expected code sequence to provide a first correlated signal and a second correlated signal respectively; and determine the first carrier phase based on the first correlated signal and determine the second carrier phase based on the second correlated signal and the reference frequency offset.

In one or more embodiments, the receive path may be configured to: determine a first channel impulse response, CIR, based on the first correlated signal and a second CIR based on the second correlated signal; determine a first path sample based on the first CIR a second path sample based on the second CIR; and determine the first carrier phase based on the first path sample and determine the second carrier phase based on the second path sample and the reference frequency offset.

In one or more embodiments, the receive path may be configured to: determine a residual frequency offset error of the tracking module based on a difference between the first frequency offset and the reference frequency offset; determine a phase correction factor based on the residual frequency error; and determine the second carrier phase based on the second corrected signal and the phase correction factor.

In one or more embodiments, the receive path may be configured to adjust a frequency of an analog front end by the reference carrier frequency offset. The tracking module may be configured to determine a residual frequency offset error as the first frequency offset.

In one or more embodiments, the transceiver may be configured to receive the first portion of the packet from a first receive antenna of the transceiver coupled to the receive path and receive the second portion of the packet from a second receive antenna of the transceiver coupled to the receive path.

In one or more embodiments, the transceiver may be configured to switch a coupling of the receive path from the first antenna to the second antenna prior to receipt of the second portion of the packet.

In one or more embodiments, the transceiver may be configured to switch a coupling of the receive path from the first antenna to the second antenna in response to the tracking module being disabled.

In one or more embodiments, the transceiver may be configured to receive the first portion of the packet from a first transmit antenna of the second transceiver configured to transmit the packet and receive the second portion of the packet from a second transmit antenna of the second transceiver.

In one or more embodiments, the transceiver may comprise one or more further receive paths each configured to receive the first portion and the second portion of the angle of arrival packet from corresponding further antenna pairs.

In one or more embodiments, the transceiver may be an ultra-wideband transceiver.

In one or more embodiments, the receive path may comprise:

a processing module configured to:
  receive the first portion of the angle of arrival packet of the received signalling from the first antenna;
  receive a carrier estimate signal;
  adjust the frequency and/or the phase of the first portion based on the carrier estimate signal to provide the first corrected signal; and
  correlate the first corrected signal with an expected code sequence to provide a first correlated signal;
the tracking module configured to:
  receive the first correlated signal; and
  update the carrier estimate signal based on the first correlated signal, wherein the processing module is further configured to:
  receive the second portion of the angle of arrival packet from the second antenna;
  receive the carrier estimate signal based on the first correlated signal;
  adjust the frequency and/or the phase of the second portion based on the carrier estimate signal to provide the second corrected signal; and
  correlate the second corrected signal with the expected code sequence to provide a second correlated signal, and
wherein the receive path further comprises a phase calculation module configured to:
  receive the first correlated signal and determine the first carrier phase based on the first correlated signal;
  receive the second correlated signal and determine the second carrier phase based on the second correlated signal; and
  determine the angle of arrival of the packet of the received signalling based on the first carrier phase and the second carrier phase.

In one or more embodiments, the receive path may be configured to:
  enable the tracking module during receipt of the first portion such that the tracking module is configured to update the carrier estimation signal; and
  disable the tracking module prior to receipt of the second portion such that the carrier estimate signal remains constant during receipt of the second portion.

In one or more embodiments, the first portion may comprise a synchronisation field and the first correlated signal may respectively comprise a correlated synchronisation signal. The tracking module may be configured to update the carrier estimate signal based on the correlated synchronisation signal.

In one or more embodiments, the phase calculation module may be configured to determine the first carrier phase based on the synchronisation correlated signal.

In one or more embodiments, the first portion may further comprise a further first field and the first correlated signal may respectively comprise a further first correlated signal. The phase calculation module may be configured to determine the first carrier phase based on the further correlated signal.

In one or more embodiments, the first portion may comprise a first part of the synchronisation field and the second portion may comprise a second part of the synchronisation field.

According to a second aspect of the present disclosure there is provided a method for calculating an angle of arrival of received signalling at a transceiver, comprising:
  receiving a polling packet from a second transceiver, the polling packet indicating a polling packet transmission time;
  transmitting a response packet to the second transceiver in response to receiving the polling packet;
  receiving a second packet from the second transceiver following transmission of the response packet, the second packet indicating a second packet transmission time;
  determining a reference frequency offset between a local oscillator of the transceiver and a local oscillator of the second transceiver based on the polling packet transmission time, a polling packet arrival time, the second packet transmission time and a second packet arrival time, and a nominal carrier frequency;
  receiving a first portion of an angle of arrival packet of the received signalling from a first antenna;
  enabling a tracking module to determine a first frequency offset and/or a first phase offset of the first portion;
  correcting the first portion based on the first frequency offset and/or the first phase offset to provide a first corrected signal;
  determining a first carrier phase based on the first corrected signal;
  disabling the tracking module;
  receiving a second portion of the angle of arrival packet of the received signalling from a second antenna;
  correcting the second portion based on the first frequency offset and/or the first phase offset to provide a second corrected signal;
  determining a second carrier phase based on the second corrected signal and the reference frequency offset; and
  determining an angle of arrival of the angle of arrival packet based on the first carrier phase and the second carrier phase.

According to a further aspect of the present disclosure there is provided a transceiver for calculating an angle of arrival of received signalling, the transceiver configured to:
  receive a polling packet from a second transceiver;
  receive a second packet from the second transceiver;
  determine a reference frequency offset between a local oscillator of the transceiver and a local oscillator of the second transceiver based on a polling packet transmission time, a polling packet arrival time, a second packet transmission time and a second packet arrival time, and a nominal carrier frequency;
wherein the transceiver comprises a receive path configured to:
  receive a first portion of an angle of arrival packet of the received signalling from a first antenna;
  enable a tracking module to determine a first frequency offset and/or a first phase offset of the first portion;
  correct the first portion based on the first frequency offset and/or the first phase offset to provide a first corrected signal;
  determine a first carrier phase based on the first corrected signal;
  disable the tracking module;
  receive a second portion of the angle of arrival packet of the received signalling from a second antenna;
  correct the second portion based on the first frequency offset and/or the first phase offset to provide a second corrected signal;
  determine a second carrier phase based on the second corrected signal and the reference frequency offset; and
  determine an angle of arrival of the angle of arrival packet based on the first carrier phase and the second carrier phase.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
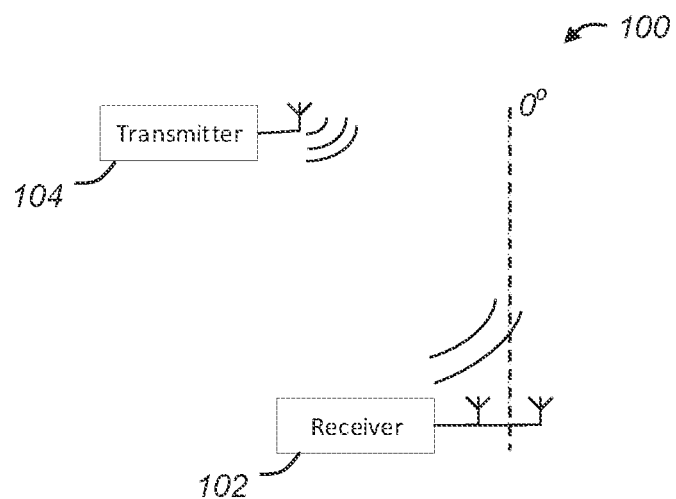
FIG. 1 provides an overview of system for determining an angle of arrival (AoA) estimation.

FIG. 1 provides an overview of a system 100 for determining an angle of arrival (AoA) estimation. The aim of angle of arrival estimation is to find the angle with respect to a transceiver 102 from which a second transceiver 104 sent a packet. It requires that at least two antennas at known different locations are used for reception (as illustrated) and/or transmission. With two antennas, an angle of −90° to +90° with respect to the 0° reference can be determined. Using more antennas at certain locations can enable extension of the range and also enable the system to determine the angle of arrival in a 3-D coordinate system, e.g. azimuth and elevation.

Figure 2:
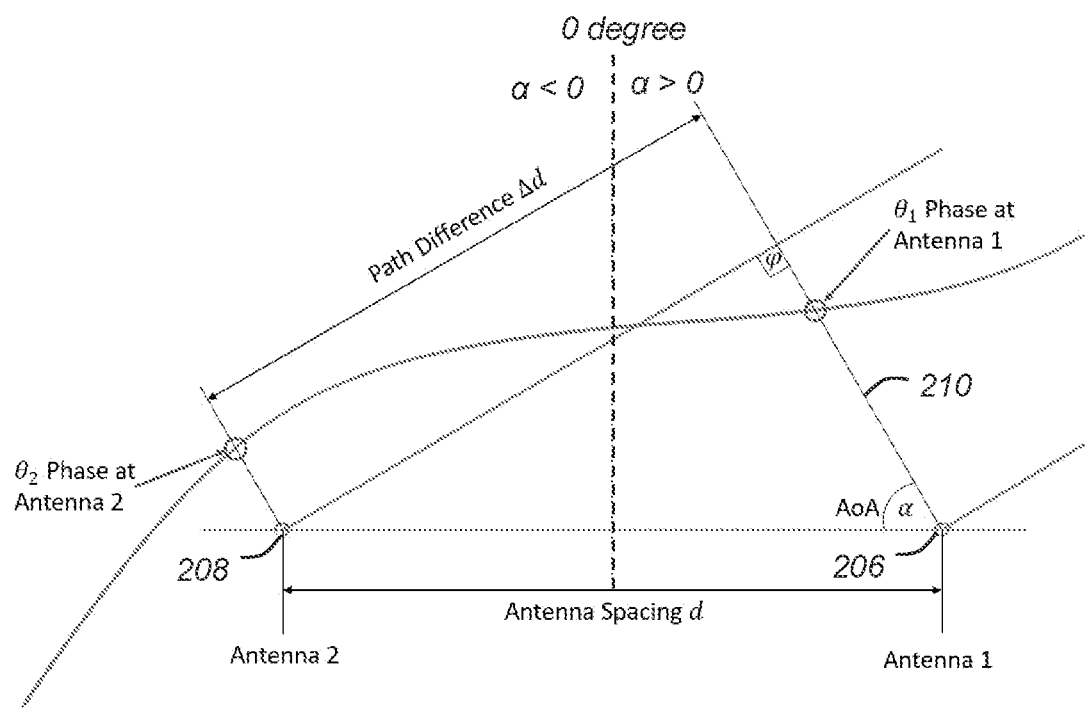
FIG. 2 illustrates a wavefront arriving at a transceiver antenna array comprising a first antenna and a second antenna.

FIG. 2 illustrates a wavefront 210 arriving at an antenna array of the transceiver comprising a first antenna 206 and a second antenna 208. It is assumed that a distance, $d_{tx,rx}$, between the second transceiver antenna and the transceiver antenna array, 206, 208, is much larger than the antenna spacing, d, i.e. $d_{tx,rx} \gg d$. This assumption provides that the incoming wavefront 210 can be depicted by parallel lines arriving at each antenna 206, 208. Therefore, an angle, φ, between the wavefront 210 and a direction vector of the wavefront can be assumed to be 90°. Furthermore, to simplify the description it is assumed that the antenna spacing, d, is less than or equal half the wavelength of the transmission carrier frequency, i.e. $d < \lambda/2$. With this assumption, there are no ambiguities in the angle of arrival estimation which have to be resolved using any additional information. For antenna spacings greater than $\lambda/2$, only using the phase difference can result in multiple valid solutions of the angle of arrival estimation and some further information may be required to find the right estimate, e.g. using a compass, gyroscope or additional information extracted from the received signal. The additional information can also come from using more than two antennas. Therefore, the present disclosure is not limited to antenna spacings less than or equal to $\lambda/2$ and the usage of multiple antennas is within the scope of this disclosure. Multiple antennas can be placed in a certain way to be able to resolve the ambiguities as is known in the art.

The wavefront 210 arrives "from the right-hand-side", i.e. from an angle of arrival, $\alpha < 0$, and is first received at the first antenna 206. In other examples, the same angle of arrival could be designated as a negative angle depending on the definition of the angle of arrival, for example a complementary angle to α could be used instead. The incoming signal is depicted as sine wave to illustrate the different phase values at the two antennas 206, 208.

The incoming signal arrives at the first antenna 206 with a first carrier phase, $\theta_1$. The signal has to travel a path difference, Δd, to reach the second antenna 208. The further distance depends on the antenna spacing, d, and the angle of the transceiver with respect to the second transceiver—the angle of arrival, α. The incoming signal arrives at the second antenna 208 with a second carrier phase, $\theta_2$. A phase difference, Δθ, depends upon the transmission carrier frequency, $f_c$, and the path difference, Δd. From the known antenna spacing, d, and the estimated carrier phases, $\theta_1$, $\theta_2$, the phase difference, Δθ, between the first and second antenna 206, 208 can be calculated as:

$$\Delta\theta = \theta_2 - \theta_1 \tag{1}$$

The path difference can be calculated from the phase difference as:

$$\Delta d = \lambda_c * \Delta\theta * \frac{1}{2\pi} \tag{2}$$

where $\lambda_c$ is the carrier wavelength of the incoming signal equal to $c/f_c$, where c is the speed of light. The angle of arrival, a, can be computed using the law of sines with the assumption that φ=90° as:

$$\alpha = \sin^{-1}\left(\frac{\Delta d}{d}\right) \tag{3}$$

Therefore, for an angle of arrival estimation, a transceiver system should estimate the phases of the incoming signal at different antenna locations and perform the above calculations to determine the angle of arrival from the phase difference. The transceiver system may have to compensate for a frequency offset, $\Delta fo$, between a frequency of (a clock of) the second transceiver and a frequency of (a clock of) the transceiver.

A transceiver system may determine a carrier phase as follows. First, a carrier frequency offset and phase error of the received signal is corrected. Following this, the transceiver system can correlate the corrected signal and integrate the correlated signal to provide a complex-valued channel impulse response (CIR) estimation. The system can determine carrier phase from the CIR using a complex first path sample. The system can determine the first path sample by applying a first path detection algorithm to the CIR. Advantageously, this allows the transceiver system to also determine the phase in non-line of sight (NLOS) conditions. To enable an angle of arrival estimation, the transceiver system requires two such complex first path samples received from two different receive antennas.

In a transceiver system with multiple physical receive paths (or receive chains), the receive path that detects a signal first may determine the carrier frequency and phase error estimation and a respective tracking loop of the receive path corrects a frequency and phase error by rotating the received signal. The other receive paths can then correct the incoming signal using the same carrier estimation in order to preserve the phase difference information. If every receive path used its own carrier tracking loop, they would all correct their phase errors independently and therefore the phase relationship would be lost.

To enable this angle of arrival estimation, transceiver systems may comprise a plurality of antennas for determining an angle of arrival of an incoming signal. The transceiver system may include a receive path of signal processing components for each antenna such that the number of receive paths is equal to the number of antennas.

The present disclosure relates to a transceiver comprising which can comprise a number of receive paths that is less than a number of corresponding antennas. The disclosure relates to a transceiver comprising a receive path which can receive signalling from a plurality of antennas and determine a corresponding angle of arrival. This can advantageously result in simpler transceiver systems, for example a transceiver system with only a single receive path, which can result in cost and chip area savings. Furthermore, transceiver systems with only a single receive antenna (and corresponding receive path) can determine an angle of arrival estimation for a signal received from a second transceiver with two transmit antennas.

In one example, with two antennas and one receive path, the receive path can estimate an angle between −90° and +90° from the 0° reference. The setup can be extended arbitrarily, e.g. to two receive chains with two antennas each, i.e. an antenna array of four antennas. Extending the set-up can enable the transceiver to distinguish whether the second transceiver is in front or behind the transceiver antenna array.

Figure 10:
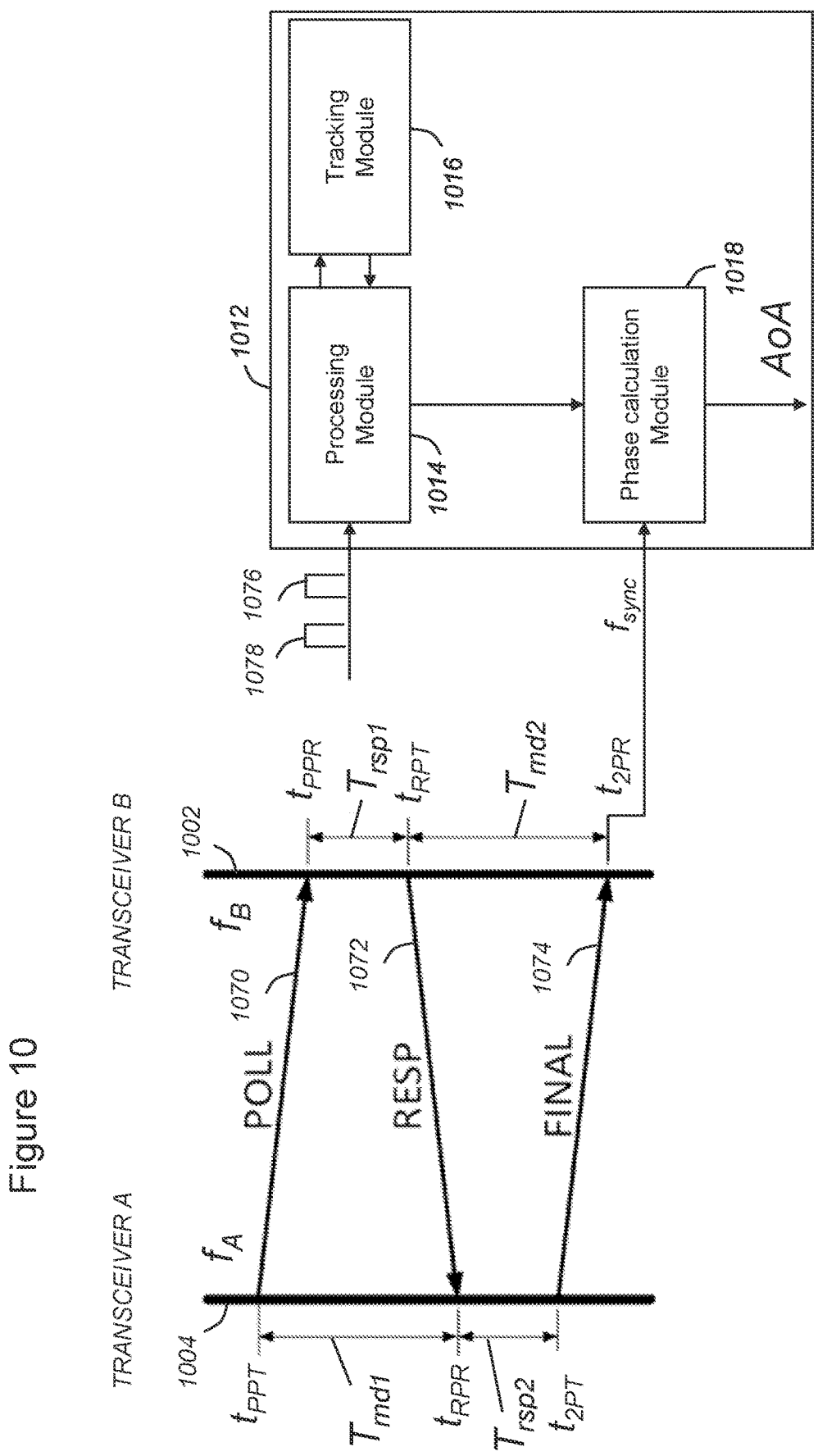
FIG. 10 illustrates a transceiver according to an embodiment of the present disclosure.

FIG. 10 illustrates a transceiver 1002 according to an embodiment of the present disclosure. The transceiver 1002 is configured to: determine a reference frequency offset relative to a second transceiver 1004 based on double sided ranging; correct first and second portions of a packet received from a respective first and second antenna; and determine an angle of arrival of the packet based on corrected first and second portions and the reference frequency offset.

The transceiver 1002 is in communication with a second transceiver 1004. The transceiver 1002 is configured to determine an angle of arrival of received signalling from the second transceiver 1004. The transceiver 1002 comprises a receive path 1012 including a processing module 1014, a tracking module 1016 and a phase calculation module 1018. The receive path 1012 is configured to receive a first portion 1076 of an angle of arrival packet of the received signalling from a first antenna and a second portion 1078 of the angle of arrival packet from a second antenna. The receive path 1012 is configured to enable the tracking module 1016 during receipt of the first portion 1076 to determine a first frequency offset and first phase offset of the first portion. The processing module 1014 corrects the first portion 1076 based on the first frequency offset and/or the first phase offset to provide a first corrected signal. The receive path 1012 is further configured to disable the tracking module 1016 prior to receiving the second portion 1078. The processing module 1014 corrects the second portion based on the first frequency offset and/or first phase offset to provide a second corrected signal. The phase calculation module 1018 determines a first carrier phase corresponding to the first portion 1076 from the first antenna based on the first corrected signal. The phase calculation module 1018 determines a second carrier phase corresponding to the second portion 1076 from the second antenna based on the second corrected signal and a reference frequency offset, $f_{sync}$. The phase calculation module 1018 determines an angle of arrival of the received signalling based on the first carrier phase and the second carrier phase.

As discussed further below in relation to FIGS. 5 to 7, the phase calculation module 1018 may apply a correction factor, based on the reference frequency offset, $f_{sync}$, when determining the second carrier phase. The reference frequency offset, $f_{sync}$, provides an accurate frequency offset between the local oscillators of the transceiver 1002 and the second transceiver 1004.

The transceiver 1002 determines the reference frequency offset, $f_{sync}$, based on polling signalling 1070, 1072, 1074 exchanged between the transceiver 1002 and the second transceiver 1004 (double sided ranging). Double-sided ranging is already used for localization or positioning systems. Therefore, the disclosed transceivers and receive paths and angle of arrival estimation algorithms can be advantageously implemented in these systems with low effort to provide the angle of arrival as an additional input to the system and increase the system performance.

The transceiver 1002 receives a polling packet 1070 from the second transceiver 1004 at a polling packet receipt time, $t_{PPR}$. The polling packet includes an indication of a polling packet transmission time, $t_{PPT}$. The transceiver 1002 transmits a response packet 1072 in response to receiving the polling packet 1070. The transceiver 1002 transmits the response packet 1072 at a response packet transmission time, $t_{RPT}$. The response packet transmission time, $t_{RPT}$, is delayed relative to the polling packet receipt time, $t_{PPR}$, due to a finite first response time, $T_{rsp1}$, of the transceiver 1002 in processing the signals. The second transceiver 1004 receives the response packet at a response packet receipt time, $t_{RPR}$. The time from the polling packet transmission time, $t_{PPT}$, to the response packet receipt time, $t_{RPR}$, may be referred to as a first round trip time, $T_{rnd1}$. The first round trip time, $T_{rnd1}$, comprises the actual time of flight of the polling and response packets 1070, 1072 plus the first response time $T_{rsp1}$. The second transceiver 1004 transmits a second packet 1074 to the transceiver 1002 at a second packet transmission time, $t_{2PT}$, in response to receiving the response packet 1072. The second packet transmission time, $t_{2PT}$, is delayed relative to the response packet receipt time, $t_{RPR}$, due to a finite second response time, $T_{rsp2}$, of the transceiver 1004 in processing the signals. The second packet 1074 includes an indication of the second packet transmission time, $t_{2PT}$. The transceiver 1002 receives the second packet 1074 from the second transceiver 1004 at a second packet receipt time, $t_{2PR}$. The time from the response packet transmission time, $t_{RPT}$, to the second packet receipt time, $t_{2PR}$, may be referred to as a second round trip time, $T_{rnd2}$. The second round trip time, $T_{rnd2}$, comprises the actual time of flight of the response and second packets 1072, 1074 signals plus the second response time $T_{rsp2}$. As discussed below, the transceiver 1002 is configured to determine the reference frequency offset between local oscillator frequencies ($f_B$, $f_A$) of the transceiver 1002 and the second transceiver 1004 based on the polling packet transmission time, $t_{PPT}$, the polling packet receipt time, $t_{PPR}$, the second packet transmission time, $t_{2PT}$, and the second packet receipt time, $t_{2PR}$, and a nominal carrier frequency, $f_n$. The nominal carrier frequency may comprise a carrier frequency at which the transceiver 1002 and second transceiver 1004 are designed to transmit and receive signalling.

As will become apparent, the polling packet transmission time, $t_{PPT}$, the response packet receipt time, $t_{RPR}$, the second packet transmission time, $t_{2PT}$, the first round trip time, $T_{rnd1}$, and/or the second response time, $T_{rsp2}$, may each be measured with respect to the local oscillator (clock) of the second transceiver 1004. As a result, the polling packet transmission time, $t_{PPT}$, and second packet transmission time, $t_{2PT}$, indicated in the respective polling packet 1070 and second packet 1074 may represent times measured by the second transceiver 1004. In a similar manner, the polling packet receipt time, $t_{PPR}$, the response packet transmission time, $t_{RPT}$, the second packet receipt time, $t_{2PR}$, the first response time, $T_{rsp1}$, and/or the second round trip time, $T_{rnd2}$, may each be measured with respect to the local oscillator (clock) of the transceiver 1002.

As the first round trip time, $T_{rnd1}$, encompasses the first response time, $T_{rsp1}$, and the second round trip time, $T_{rnd2}$, encompasses the second response time, $T_{rsp2}$, the time from transmission of the polling packet 1070 and transmission of the second packet 1074 at the second transceiver 1004 ($T_{rnd1}+T_{rsp2}=t_{2PT}-t_{PPT}$) must be equal to the time between receipt of the polling packet 1070 and receipt of the second packet 1074 ($T_{rsp1}+T_{rnd2}=t_{2PR}-t_{PPR}$) at the transceiver 1002. This equality can be seen from observation of the times in FIG. 10. The equality is independent of the time of flight, as both packets experience the same time of flight (assuming a distance between the transceiver 1002 and second transceiver 1004 remains unchanged as the polling packet 1070 and the response packet 1074 are transferred). However, the equality holds only in a fixed time or frequency frame of reference, for example with respect to the nominal carrier frequency, $f_n$:

$$T_{rsp1}'+T_{rnd2}'=T_{rnd1}'+T_{rsp2}' \tag{4}$$

Where the ' superscript refers to actual times in a frame of reference with a clock operating at the nominal carrier frequency, $f_n$. The times measured by the transceiver 1002 and the second transceiver 1004 will depend on the respective local oscillator frequencies, $f_A$, $f_B$, relative to the nominal frequency, $f_n$. The actual first response time, $T'_{rsp1}$, (as measured in the frame of reference of the nominal carrier frequency clock) depends on the intended (or measured) first response time, $T_{rsp1}$, and the local oscillator frequency, $f_B$, of the transceiver 1002:

$$T'_{rsp1} = T_{rsp1} \frac{f_n}{f_B} \tag{5}$$

"Intended" response time refers to a time that was configured as the response time (by the transceiver). However, the actual time is different due to the frequency offset of the local oscillator.

The actual second response time, $T'_{rsp2}$, depends on the intended response time, $T_{rsp2}$, and the local oscillator frequency, $f_A$, of the second transceiver 1004:

$$T'_{rsp2} = T_{rsp2} \frac{f_n}{f_A} \tag{6}$$

The first round time, $T_{rnd1}$, as measured at the second transceiver 1004, depends on the actual round time, $T'_{rnd1}$, and the local oscillator frequency, $f_A$, of the second transceiver 1004:

$$T_{rnd1} = T'_{rnd1} \frac{f_A}{f_n} \tag{7}$$

The second round time, $T_{rnd2}$, as measured at the transceiver 1002, depends on the actual round time, $T'_{rnd2}$, and the local oscillator frequency, $f_B$, of the transceiver 1002:

$$T_{rnd2} = T'_{rnd2} \frac{f_B}{f_n} \tag{8}$$

Substituting the expressions for actual times in terms of measured times from equations (5)-(8) into equation (4), the nominal carrier frequency terms cancel out and we can obtain an expression for a relative frequency factor, $f_r$, defining the ratio between the local oscillator frequencies of the transceiver 1002 and the second transceiver 1004:

$$\frac{T_{rsp1}}{f_B} + \frac{T_{rsp2}}{f_B} = \frac{T_{rnd1}}{f_A} + \frac{T_{rnd2}}{f_A} \tag{9}$$

$$f_r = \frac{f_A}{f_B} = \frac{T_{rnd1} + T_{rsp2}}{T_{rsp1} + T_{rnd2}} = \frac{t_{2PT} - t_{PPT}}{t_{2RP} - t_{PPR}}$$

In other words, the relative frequency factor, $f_r$, is equal to a difference between the second packet transmission time, $t_{2PT}$, and the polling packet transmission time, $t_{PPT}$, (as measured by the second transceiver 1004) divided by a difference between the second packet receipt time, $t_{2PR}$, and the polling packet receipt time, $t_{PPR}$ (as measured by the transceiver 1002).

The reference frequency offset, $f_{sync}$, in Hz can be determined from the relative frequency factor, $f_r$, as follows:

$$f_r = \frac{f_A}{f_B} = \frac{f_n + \Delta f_A}{f_n + \Delta f_B} = \tag{10}$$

$$\frac{f_n + \Delta f_B - \Delta f_B + \Delta f_A}{f_n + \Delta f_B} = 1 + \frac{\Delta f_A - \Delta f_B}{f_n + \Delta f_B} = 1 + \frac{\Delta f}{f_n + \Delta f_B} \approx 1 + \frac{\Delta f}{f_n}$$

$$fsync = \Delta f \approx (f_r - 1) f_n$$

In other words, the reference frequency offset, $f_{sync}$, is equal to the nominal carrier frequency, $f_n$, multiplied by 1 less than the relative frequency factor.

Determining the reference frequency offset, $f_{sync}$, from the measured packet transmission and receipt times in the above manner can provide a number of advantages over estimating the reference frequency offset using a dedicated synchronisation packet and a tracking loop or other methods known in the art. The advantages can include:

- A more accurate result based on a calculation rather than an estimation which includes estimation errors.
- The polling packet 1070 and/or the second packet 1074 can be used as the angle of arrival packet. As a result, no synchronization packet is required prior to the angle of arrival calculation. Angle of arrival calculations from both the polling packet 1070 and the second packet 1074 can be combined to increase the overall estimation accuracy of the angle of arrival.
- The second transceiver 1004 can also perform an angle of arrival estimation if the transceiver transmits the reference frequency offset, $f_{sync}$, to the second transceiver in a subsequent (third packet).

Figure 3:
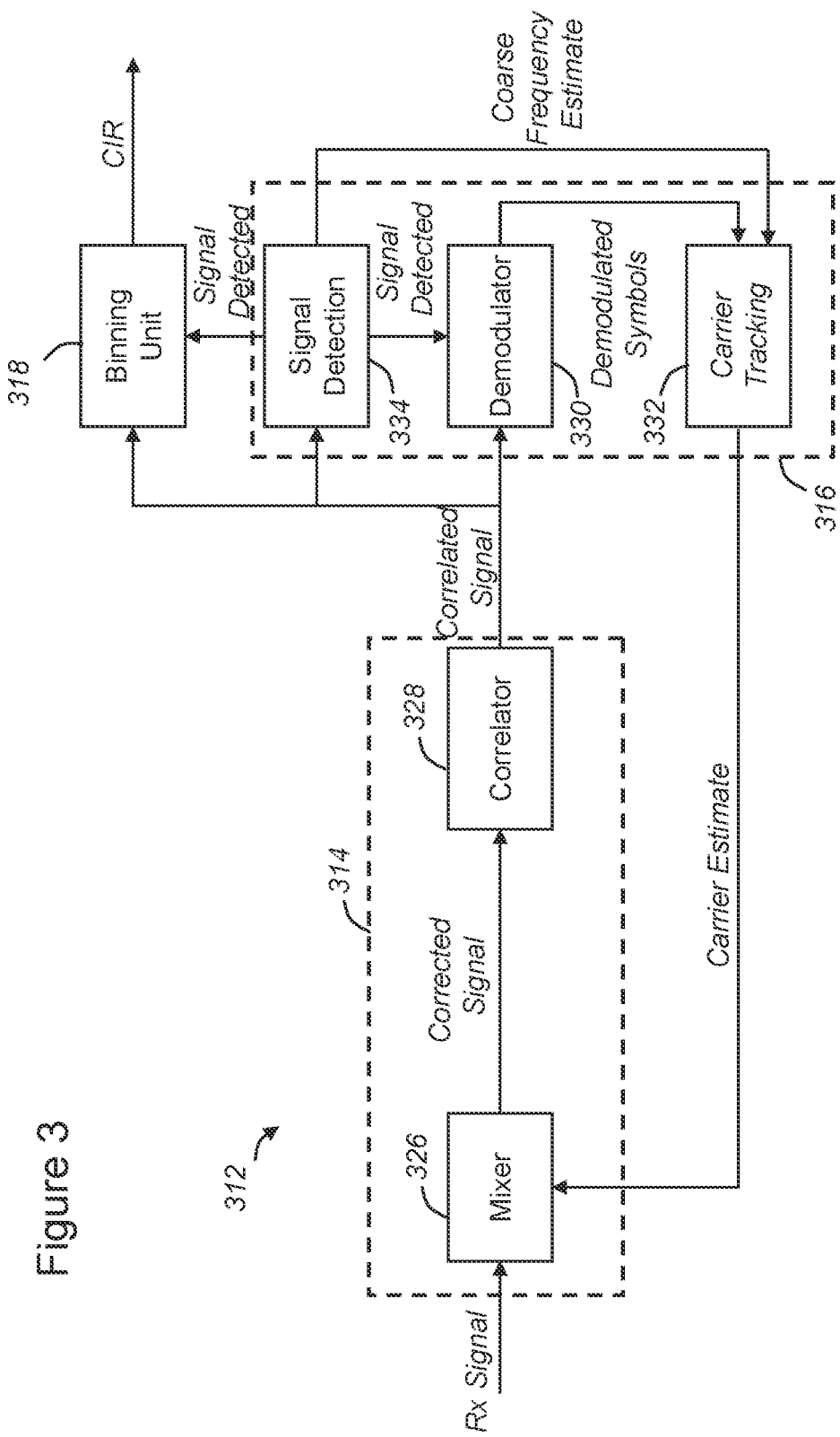
FIG. 3 illustrates a receive path of a transceiver according to an embodiment of the present disclosure.

Returning to the determination of the angle of arrival by a single receive path, FIG. 3 illustrates a more detailed receive path 312 of a transceiver according to an embodiment of the present disclosure. The receive path 312 comprises the processing module 314, the tracking module 316 and the phase calculation module 318.

The receive path 312 is configured to receive the first portion of the angle of arrival packet from the first antenna and correct the phase and/or frequency of the first portion using the tracking module 316 in a tracking loop which provides a carrier estimate signal. Following this, the receive path 312 disables or pauses the tracking module 316 (and tracking loop) and receives the second portion of the angle of arrival packet from the second antenna. The phase and or frequency of the second portion is then corrected using the carrier estimate signal calculated for the first portion. The phase calculation module 318 determines: (i) a first carrier phase based on the first portion of the packet received from the first antenna; and (ii) a second carrier phase based on the second portion received from the second antenna. The phase calculation module 318 may determine the first and second carrier phases via integration, CIRs and complex paths as outlined above and described further below. The phase calculation module can determine an angle of arrival based on a difference between the first and second carrier phases as outlined above. As described below, the phase calculation module 318 applies a residual error correction to the second portion of the packet, based on the reference frequency offset, $f_{sync}$, to determine an accurate angle of arrival estimation.

The carrier estimate signal may comprise an estimate of, or compensation of, a carrier frequency offset and/or a carrier phase offset (error) relative to the local oscillator clock associated with the receive path. The carrier estimate signal may comprise a combined estimation of carrier frequency offset and carrier phase error or may comprise phase and frequency errors as separate signals. Either way, the processing module can correct both carrier frequency offset and carrier phase error based on the carrier estimate signal. The tracking loop may be 2nd order to correct both phase and frequency with a combined carrier estimate signal.

Figure 4:
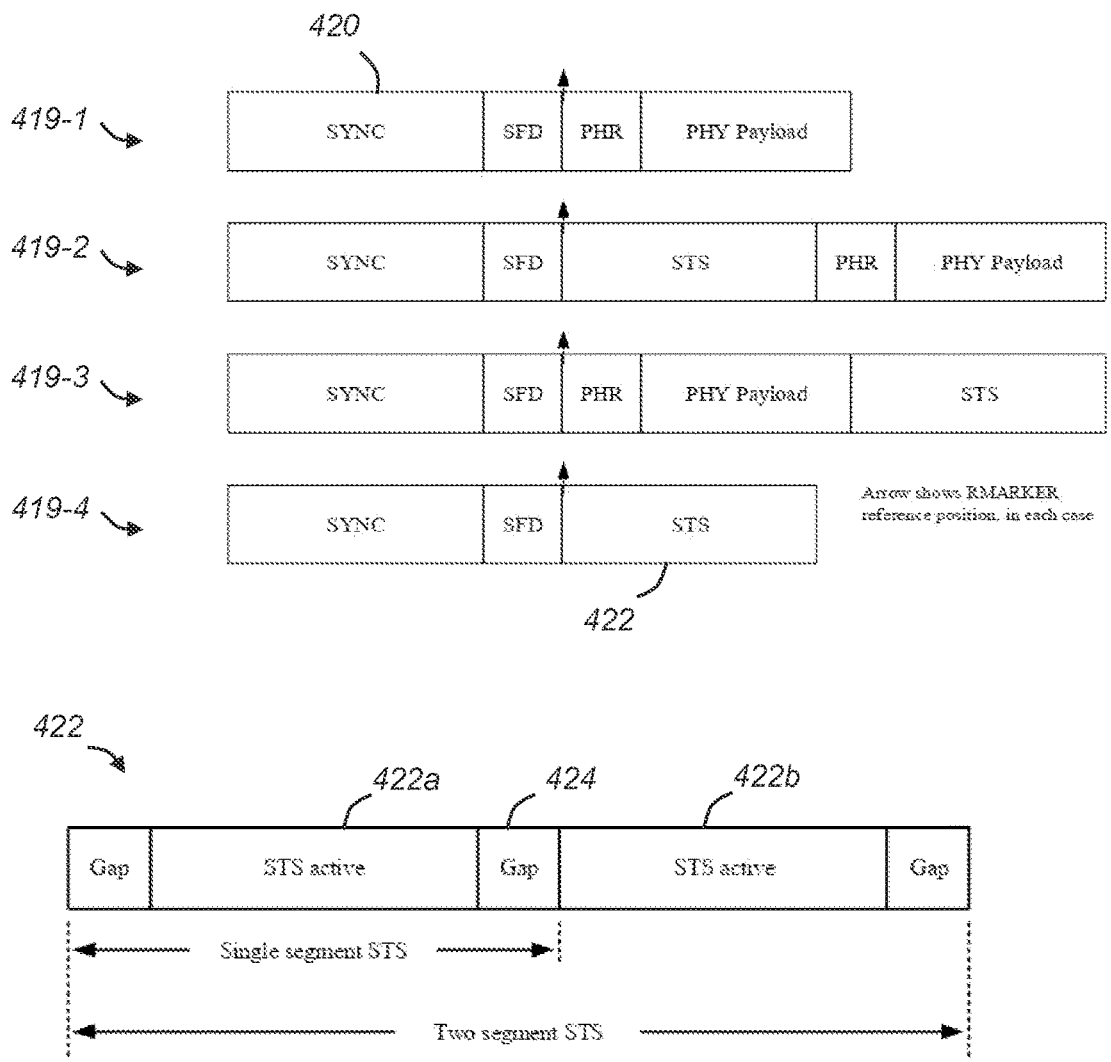
FIG. 4 illustrates packet structures suitable for use in a transceiver according to an embodiment.

FIG. 4 illustrates packet structures 419 suitable for use in a receive path according to an embodiment. The packet structures 419 illustrated are ultra-wide-band packet structures according to IEEE 802.15.4z although the disclosure is not limited thereto.

First to fourth STS packet configurations 419-1, 419-2, 419-3, 419-4 are illustrated, referred to collectively as packet structures 419. Each packet structure 419 comprises a synchronisation field, SYNC, 420 (or synchronisation part). A receive path can use the synchronisation field 420 to determine whether a signal is present and to synchronize to that signal, for example to synchronize a local clock to that signal or to adjust the incoming signal to match the local clock. After the receive path detects the signal, a remaining part of the synchronisation field 420 can be integrated over multiple symbols to estimate a channel impulse response (CIR).

Some of the illustrated packet structures 419 also comprise a scrambled timestamp sequence (STS) field 422 which the receive path can also integrate to form a CIR. The STS field 422 can be used in ranging applications to determine a distance between two devices in a secure manner. In some examples, the STS field 422 can be optionally split into multiple segments 422a, 422b, as shown in the lower part of FIG. 4. The STS field 422 comprises a gap 424 between the segments 422a, 422b, in which no data is transmitted. The gap may be on the order of 1 µs.

The receive path is configured to receive a first portion of a packet from a first antenna and a second portion of the packet from a second antenna. As explained further below, the first and second antenna may form part of the transceiver comprising the receive path 312 or the first and second antenna may form part of the second transceiver from which the packet is received. Either way, antenna switching occurs between the first portion and the second portion of the packet. For example, a transceiver system may switch between a first and second antenna of the transceiver system between receipt of the first portion and receipt of the second portion. Alternatively, the second transceiver may switch between a first and second antenna of the second transceiver between transmission of the first portion and transmission of the second portion. The antenna switching can take a time on the order of 0.1-1 µs. The packet structures 419 of FIG. 4 can facilitate this antenna switching as the antenna switching can occur during a non-critical data portion of the packet, such as the synchronisation field 420 or the gap 424. For example, for STS configuration three 419-3, the antenna switching can occur: (i) in the gap between the start of frame delimiter (SFD) and the STS field 422; or (ii) in the gap 424 between STS segments 422a, 422b. These switching points can allow for simple and defined processing in the transceiver and result in one CIR estimate for the synchronisation field 420 and one CIR for each STS segment 422a, 422b. If required, antenna switching can still occur at other points in the packet structure 419. If the polling packet and/or second packet are used for angle of arrival estimation, the payload of the packet structure may include the polling packet transmission time, $t_{PPT}$, or the second packet transmission time, $t_{2PT}$, as appropriate.

The receive paths and transceiver systems disclosed herein are not limited to use with the packet structures of FIG. 4. Any packet structure for which the receive path can estimate multiple CIRs can be used. For example, a packet structure with a long sync part in which the antenna switching can happen may be suitable.

Returning to FIG. 3, operation of the receive path 312 to determine an angle of arrival of a received packet will now be described. A packet structure with a first portion, such as a synchronisation field, and a second portion, such as a STS field, such as those of FIG. 4 will be referred to as the received packet.

In this example, the processing unit 314 comprises a mixer 326 and a correlator 328. The mixer 326 receives a first portion of the packet from the first antenna. In this example, the first portion comprises a synchronisation field. The first portion may further comprise further first fields. The mixer 326 also receives a carrier estimate signal from the tracking module 316. Initially, the carrier estimate signal may be zero as no frequency or phase offset information is available. A goal of the mixer 326 is to adjust or correct the received signal such that imaginary components of the signal approach zero. In other words, the mixer 326 corrects the carrier frequency offset and/or phase error for coherent demodulation for better sensitivity. The mixer 326 adjusts the synchronisation field based on the carrier estimate signal to provide a corrected synchronisation signal. The corrected synchronisation signal is an example of a first corrected signal. Initially, with the carrier estimate signal set to zero, the corrected synchronisation signal may equal the received synchronisation field.

The correlator 328 receives the corrected synchronisation signal from the mixer 326 and correlates the signal with an expected code sequence to provide a correlated synchronisation signal. The correlated synchronisation signal is an example of a first correlated signal. The expected code signal can be a predetermined code sequence used by both the transceiver and the second transceiver to perform an angle of arrival calculation.

In this example the tracking module 316 comprises a demodulator 330, a carrier tracking module 332 and a signal detection module 334. Before a packet is received, the signal detection module 334 is enabled while the demodulator 330 and phase calculation module 318 are disabled. The signal detection module 334 receives a correlated signal from the correlator 328. The signal detection module 334 analyses the correlated signal to determine the strongest path in the signal and determine whether a packet has been received.

A tracking loop may be defined as comprising the processing module 314 and the tracking module 316. On a first pass of the tracking loop, the signal detection module 334 receives the correlated synchronisation signal from the correlator 328 and determines that a signal is present. In response, the signal detection module 334 activates or enables the demodulator 330 and the phase calculation module 318. The signal detection module 324 also provides a coarse frequency estimate to the carrier tracking module 332. The carrier tracking module 332 updates the carrier estimate signal based on the coarse frequency estimate. In this way, the tracking module 316 receives a first correlated signal and updates the carrier estimate signal based on the first correlated signal.

On a second pass of the tracking loop, the mixer 326 continues to receive (subsequent symbols of) the synchronisation field and corrects the synchronisation field with the updated carrier estimate signal. The correlator 328 correlates the corrected synchronisation signal and provides an updated correlated synchronisation signal to the demodulator 330. The demodulator 330 demodulates the correlated synchronisation signal and provides demodulation symbols to the carrier tracking module 332. The carrier tracking module 332 further updates and refines the carrier estimate signal based on the demodulation symbols and provides the carrier estimate signal to the mixer 326. In this way, the tracking module 316 continues to receive the first correlated signal and update the carrier estimate signal. The tracking loop continues to operate/iterate during receipt of the first portion (synchronisation field) and derive the frequency and/or phase error(s) with greater accuracy which is used by the mixer 326 to further correct and phase align the received first portion.

As outlined above, the receive path 312 is configured to receive a first portion of a packet from a first antenna and a second portion of the packet from a second antenna. The first portion of the packet may comprise: the synchronisation field; the synchronisation field and a further first field, for example an SFD field; or a first part of the synchronisation field. The second portion may comprise: a further second field subsequent to the synchronisation field, for example a STS field, or a second part of the synchronisation field.

Following receipt of the synchronisation field, or the first part of the synchronisation field, antenna switching occurs and the receive path 312 receives a second portion of the packet from the second antenna. As described above, the antenna switching may occur during the synchronisation field or during a gap between the first portion and the second portion of the packet. The receive path 312 disables the tracking module 316 following receipt of the first portion and prior to receipt of the second portion. The receive path 312 may be configured to disable the tracking module to coincide with receipt of a part of the packet at which antenna switching occurs. The receive path 312 may disable (or pause or freeze) the tracking module 316 such that the carrier estimate signal is fixed to its current value and is no longer updated. In this way, the receive path 312 may be configured to: enable the tracking module 316 during receipt of the first portion such that the tracking module 316 is configured to update the carrier estimation signal; and disable the tracking module 316 prior to receipt of the second portion such that the carrier estimate signal remains constant during receipt of the second portion.

The receive path 312 receives the second portion of the packet from the second antenna at the mixer 326. The mixer 326 receives the carrier estimate signal that is now a fixed value that was calculated for the first portion, for example for the synchronisation field. In other words, the carrier estimate signal is no longer updating because the tracking module 316 and tracking loop are disabled. This is necessary because the receive path 312 needs to determine a phase difference between the first and second portions of the packet received from respective antennas. If the tracking loop was not frozen when switching antennas, the tracking module 316 would continue to update the carrier estimate signal and the phase difference information between the first and second antennas would be lost. In such a scenario, both CIRs would show a phase of roughly 0 as the phase error is always corrected.

The mixer 326 adjusts/corrects the second portion based on the carrier estimate signal calculated for the first portion (synchronisation field in this example), to provide a second corrected signal. The correlator 328 correlates the second corrected signal to provide a second correlated signal.

The phase calculation module 318, implemented as a binning unit in this example, is configured to: receive a first correlated signal, corresponding to a first portion of the packet from the first antenna, and determine a first carrier phase; and receive a second correlated signal, corresponding to the second portion of the packet from the second antenna, and the reference frequency offset, $f_{sync}$, and determine a second carrier phase. The phase calculation module 318 can then determine the angle of arrival of the packet based on the phase difference between the first carrier phase and the second carrier phase.

The phase calculation module 318 may determine a first and second CIR based on the respective first and second correlated signals. The phase calculation module 318 may integrate the first and second correlated signals to determine the respective first and second CIRs. The phase calculation module may determine first and second path samples based on the respective first and second CIRs using a path detection algorithm. The phase calculation module 318 can determine the first and second carrier phases from the respective first and second path samples. As discussed below, the phase calculation module 318 may apply a correction factor to the second CIR or second path sample (to correct for a residual frequency error), based on the reference frequency offset, $f_{sync}$.

When the tracking loop is frozen (tracking module 316 disabled), the carrier estimation signal provided by the tracking module 316 may have a residual frequency error due to non-ideal phase error estimation and noise. This residual frequency error can correspond to a residual error of the receive path (tracking module 316) in estimating the carrier frequency offset ($f_{cfo}$)—a carrier frequency offset estimation error, $f_{cfoe}$. This residual frequency error is then applied to the second portion of the packet. As time progresses, the residual frequency error can result in a phase error in the received signal. The phase calculation module 318 can accumulate this phase error when integrating the second correlated signal to estimate the second CIR.

Here we consider a second portion of a packet comprising an STS field as described above in relation to FIG. 4. We define the term STS symbol with a length determined by the length of the integration accumulator in the phase calculation module 318, i.e. how many pulses can be added up to estimate the STS. For example, if the STS field has a total length of 32 µs (rounded for simplicity) and the phase calculation module 318 has an accumulator which can sum 1 µs long parts of the STS field, the STS field is considered to have 32 STS symbols. The phase calculation module 318 can integrate the STS field to provide an estimated CIR with a length of 1 µs (as the 1 µs STS symbols are summed).

Figure 5:
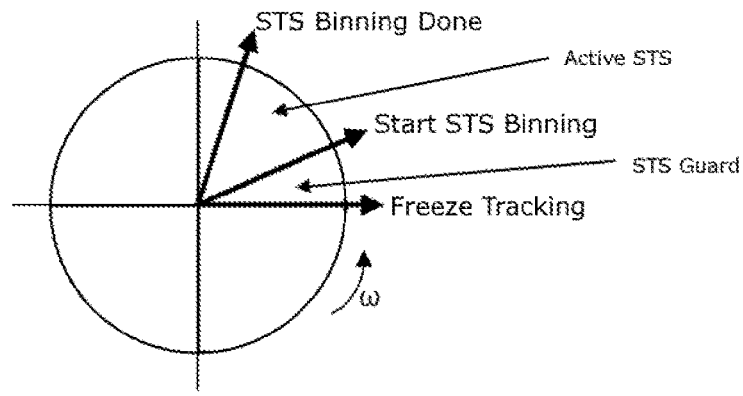
FIG. 5 illustrates the interpretation of residual frequency error in the phasor domain.

FIG. 5 shows how the residual frequency error can be interpreted in the phasor domain. For simplicity it is assumed that when the tracking loop is frozen, the phase error is at 0°. During an STS guard (corresponding to a STS gap in FIG. 4), the received signal rotates by an additional phase error depending on the residual frequency error. As the phase calculation module integrates the STS field, the received signal keeps rotating by an additional phase error depending on the residual frequency error. For every STS symbol integrated by the phase calculation module, the STS field rotates further and adds to the total phase error. Therefore, the phase error for the last STS symbol, STS symb N, will be much greater (N times greater) than the phase error for the first STS symbol, STS symb 1.

Figure 6:
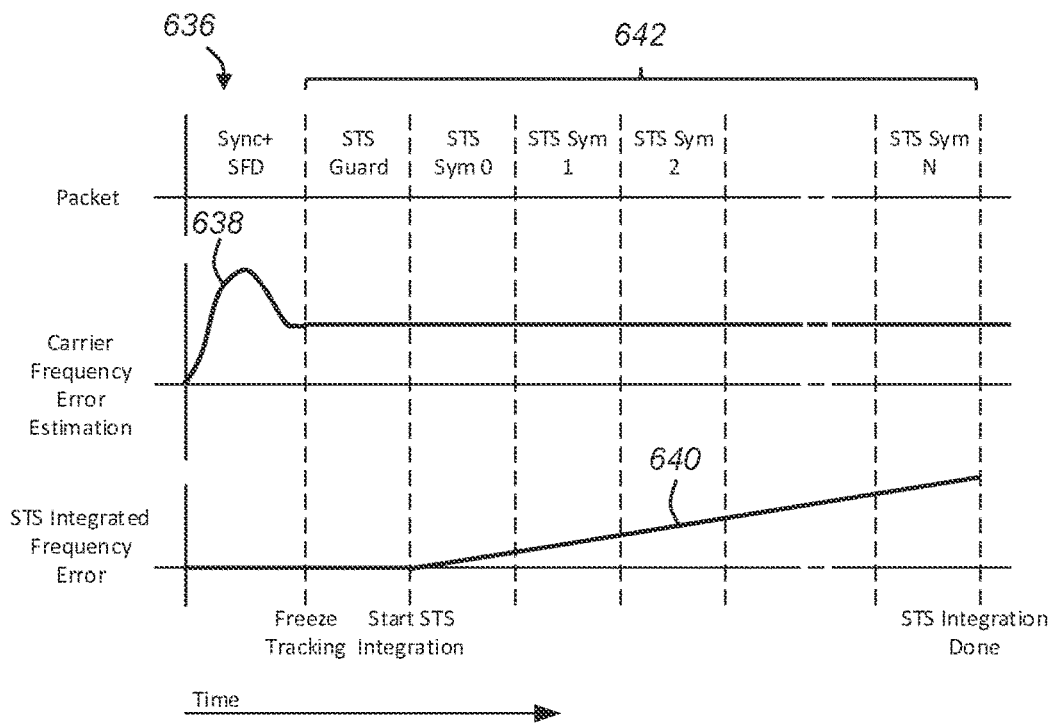
FIG. 6 illustrates the accumulation of phase error in an example embodiment.

The accumulation of phase error during the second portion is further illustrated in FIG. 6. In this example the first portion 636, received from the first antenna, comprises a synchronisation field. The second portion, received from the second antenna, comprises a STS field comprising a STS guard and a plurality of STS symbols (STS Sym 0 . . . STS Sym N). The STS guard may correspond to a gap at the start of the STS field (see FIG. 4). During the first portion, the tracking module and tracking loop are enabled and the tracking module updates the carrier estimate signal 638. The value of the carrier estimate signal 638 fluctuates during the first portion as the phase error approaches zero. Antenna switching may occur during the SFD field. The receive path disables the tracking module, thereby freezing the tracking, prior to receipt of the second portion 642. As a result, the value of the carrier estimate signal remains fixed to the last value calculated while the tracking module was enabled.

The phase calculation module integrates the second portion 642 to determine the second CIR. The phase calculation module integrates the STS symbols of the STS field 642. The phase calculation module also integrates the phase error, resulting from the residual frequency error of the tracking loop, when integrating the STS symbols. The phase error is a linearly increasing STS integrated phase error 640. As a result, the phase calculation module can rotate the second CIR by the integrated phase error leading to an inaccurate determination of the second carrier phase. The phase calculation module can correct the phase error by applying a correction factor, $S_{corr}$, to the second CIR or second path sample (based on the reference frequency offset, $f_{sync}$, as described further below). The correction factor, $S_{corr}$, may comprise a complex multiplication factor with an amplitude of 1 and a correction phase value. In the example of FIGS. 5 and 6, the correction factor should compensate the phase error resulting from the rotation of the phase during the STS guard and the integrated phase error arising during integration of the STS symbols.

Figure 7:
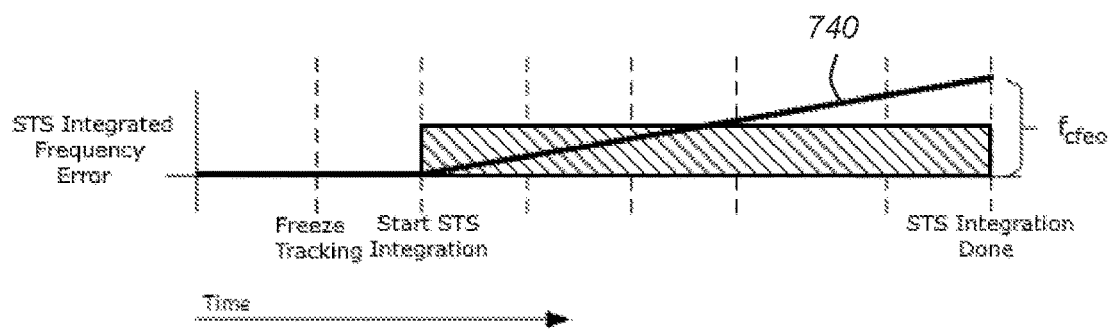
FIG. 7 further illustrates the accumulation of phase error in an example embodiment.

A derivation of the correction factor, $S_{corr}$, can be understood from FIG. 7, which illustrates the integrated error of FIG. 6. The integration of the phase error 740 over time by the phase calculation module is represented as a ramp function. As the phase calculation module integrates the STS symbols, the residual frequency error can rotate the received signal with a frequency corresponding to a carrier frequency offset error estimation, $f_{cfoe}$. The area below the ramp is the error value required for the correction factor and can be calculated as:

$$A = \frac{1}{2} f_{cfoe} t_{STS} \tag{11}$$

where $t_{STS}$ is the STS field duration, a known value. The receive path may determine the carrier frequency offset error estimation, $f_{cfoe}$, (the residual frequency error) based on the reference frequency offset, $f_{sync}$, as discussed further below. The factor 1/2 accounts for the variation in phase error for each of the STS symbols (the first STS symbol has a much smaller phase error than the last STS symbol). The error correction factor, SSTS, of the field itself can be computed using the area value as:

$$s_{sts} = e^{j2\pi \frac{1}{2} f_{cfoe} t_{STS}} \tag{12}$$

The correction factor for the STS guard, $S_{Guard}$, corresponds to a simple phase rotation resulting from the carrier frequency offset error and can be calculated as:

$$s_{guard} = e^{j2\pi f_{cfoe} t_{Guard}} \tag{13}$$

where $t_{Guard}$ is a duration of the STS Guard.
The total correction factor, $S_{corr}$, is calculated as:

$$S_{corr} = s_{Guard} * s_{sts} = e^{j2\pi f_{cfoe}\left(t_G + \frac{1}{2} t_{STS}\right)} \tag{14}$$

In some examples, the second portion may comprise an $n^{th}$ STS segment. In other examples, the receive path may be configured to receive a further portion from a further antenna. Therefore, the receive path should be able to correct for the phase error at any STS segment. In such examples, the correction factor, $S_{corr}$, can be extended to consider the rotation of all previous STS segments. In the previous STS segments a simple phase rotation occurs. In the $n^{th}$ segment the phase calculation module integrates the phase error. Therefore, the correction factor for the $n^{th}$ segment, $S_{corr,n}$, can be calculated using:

$$\rho_n = 2\pi f_{cfoe} \left( \sum_{i=1}^{n-1} (t_{G,i} + t_{STS,i}) \right) * \left( t_G + \frac{1}{2} t_{STS} \right) \quad (15)$$

$$s_{corr,n} = e^{j\rho_n}$$

where n−1 is the number of segments before the current segment, n, and $t_{G,i}$ and $t_{STS,i}$ are the guard and segment durations of the STS segments i. Typically, all segments will have the same duration but for general validity the index i is added. The residual frequency error, or frequency offset estimation error, $f_{cfoe}$, is the only unknown in equations, (11) to (14). The transceiver/receive path can determine the residual frequency error based on the reference frequency offset, $f_{sync}$, determined by the polling packet exchange described above in relation to FIG. 10.

Depending on the antenna and packet configuration, the phase calculation module can multiply the correction factor, $S_{corr}$, by the corresponding CIR or complex path sample. The first portion may comprise the synchronization field and the tracking module may be configured to update the carrier estimate signal based on a corresponding correlated synchronization signal. In some examples the phase calculation module may determine the first carrier phase based on the correlated synchronization signal. In other examples, the first portion may further comprise a further first field and the phase calculation module may determine the first carrier phase based on a respective further first correlated signal.

Example configurations may include:

Sync Field+STS Field

In this example, the first portion comprises a synchronization field and the second portion comprises a STS field. The tracking module updates the carrier estimation signal based on the correlated synchronization signal. The phase calculation module determines the first CIR and first phase based on the correlated synchronization signal. During receipt of the synchronization field, the tracking loop is enabled and no phase correction is required. Prior to receipt of the second portion, the tracking loop is disabled and a correction factor, $S_{corr}$, is required for the second CIR.

Sync+2×STS Segments

In one example, the first portion comprises the synchronization field and the second portion comprises first and second STS portions. All three fields are used to determine respective CIRs to support the angle of arrival estimation. The CIR determined based on the synchronization field does not require correction because the tracking loop is enabled. The tracking is disabled prior to receipt of the first STS segment. Therefore, the CIR of the first STS segment requires correction by factor $S_{corr,1}$, and the CIR of the second STS segment requires correction by factor $S_{corr,2}$.

In a further example, the first portion comprises the synchronization field and the first STS field and the second portion comprises the second STS field. The synchronization field is only used for signal detection and carrier correction. The tracking loop is disabled after receipt of the synchronization field but prior to both STS segments. The first and second STS segments are used to determine respective first and second phases. The first CIR corresponding to the first STS segment requires correction by factor $S_{corr,1}$, and the second CIR corresponding to the second STS segment requires correction by factor $S_{corr,2}$.

The above configurations are just examples, the procedure can be extended to multiple STS segments.

As mentioned above, the receive path may determine the residual frequency error, for example, the carrier frequency offset estimation error, $f_{cfoe}$, i.e. the residual error that the tracking loop has when estimating the carrier frequency offset, $f_{cfo}$, based on the reference frequency offset, $f_{sync}$, determined by the double sided packet polling discussed above in relation to FIG. 10. The transceiver/receive path can then determine the correction factor for the second carrier phase based on the residual frequency offset error, $f_{cfoe}$, as described above. The residual frequency offset error, $f_{cfoe}$, may be equal to a difference between the estimated carrier frequency offset, $f_{cfo}$, provided by the tracking module (during receipt of the first portion) and the reference frequency offset, $f_{sync}$.

In one example, a the polling packet and second packet can be exchanged prior to transmission of the angle of arrival packet used for angle of arrival estimation. The polling packet and second packet may comprise synchronization packets (distinct from the synchronization field of the AoA packet) which may be UWB synchronization packets.

In some examples, the transceiver can adjust an analog front end of the transceiver to account for the reference frequency offset, $f_{sync}$. As a result, the estimation of the carrier frequency offset, $f_{cfo}$, determined by the receive path during the first portion of the packet for angle of arrival estimation equals the carrier frequency offset estimation error, $f_{cfoe}$, which is required to calculate the correction factor. As a result, $f_{cfoe}=f_{cfo}$ can be substituted into the formulas outlined above for the correction factor, $S_{corr}$. As the transceiver adjusts the analog front end by the reference carrier frequency offset, $f_{sync}$, the tracking module should determine a carrier frequency offset of zero, during the AoA packet. However, during the AoA packet, the tracking loop may adjust the frequency and phase with less precision than the double polling packet calculation described above. Any residual carrier frequency offset, $f_{cfo}$, determined by the tracking module will be equal to the error in the estimation—the carrier frequency offset estimation error, $f_{cfoe}$. In this way, the receive path adjusts a frequency of the analog front end by the reference carrier frequency offset, $f_{sync}$, and the tracking module determines the residual frequency offset, $f_{cfoe}$, as the estimated carrier frequency offset, $f_{cfo}$, of the first corrected/correlated signal.

Instead of adjusting the analog front end, the receive path can determine the carrier frequency offset estimation error, $f_{cfoe}$, (the residual frequency offset error) as a difference between the reference carrier frequency offset and the estimated carrier frequency offset, $f_{cfo}$, of the first corrected/ correlated signal determined by the tracking module during the first portion of the AoA packet ($f_{cfoe}=f_{cfo} f_{sync}$). As a result, the above general formula is modified as follows:

$$\rho_n = 2\pi f_{cfoe}(f_{cfo} - f_{sync})\left(\sum_{i=1}^{n-1}(t_{G,i} + t_{STS,i})\right) * \left(t_G + \frac{1}{2}t_{STS}\right) \quad (16)$$

$$s_{corr,n} = e^{j\rho_n}$$

For example, if the reference carrier frequency offset, $f_{sync}$, is 10 ppm and the tracking module determines the carrier frequency offset, $f_{cfo}$, of the first correlated signal as 10.1 ppm, the residual frequency error, ($f_{cfoe}=f_{cfo}-f_{sync}$), is 0.1 ppm.

Figure 8:
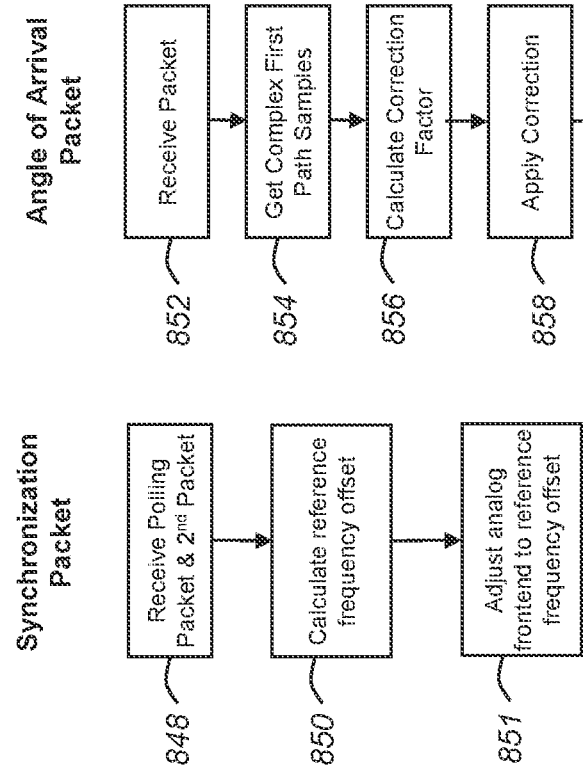
FIG. 8 illustrates a process of a transceiver receiving a polling packet and second packet prior to an angle of arrival packet according to an embodiment of the present disclosure.

FIG. 8 illustrates a process of a receive path receiving the polling packet and second packet prior to the angle of arrival packet according to an embodiment of the present disclosure.

At step 848, the transceiver receives the polling packet and second packet from the second transceiver. At step 850, the transceiver calculates the reference frequency offset, $f_{sync}$, between the local oscillators of the transceiver and the second transceiver, based on the transmission and receipt times of the polling packet and the second packet, and the nominal carrier frequency (as described above in relation to FIG. 10 and equation 10). At step 851, the transceiver/receive path adjusts the analog front end of the transceiver by a frequency equal to the reference carrier frequency offset, $f_{sync}$.

At step 852, the receive path receives an angle of arrival packet from a first antenna and a second antenna (as described above). The angle of arrival packet originates from the second transceiver that transmitted the polling and second packets. At step 854, the receive path estimates the complex path samples as described above. At step 856 the receive path calculates the correction factor based on the residual frequency error equaling the carrier frequency offset estimated by the tracking loop for the AoA packet. At step 858, the receive path applies the correction factor to CIRs or path samples for which the tracking loop was disabled. At steps 860 and 862, the receive path calculates the phase difference between the first portion and second portion of the AoA packet received from the first and second antennas and estimates the corresponding angle of arrival.

Figure 9:
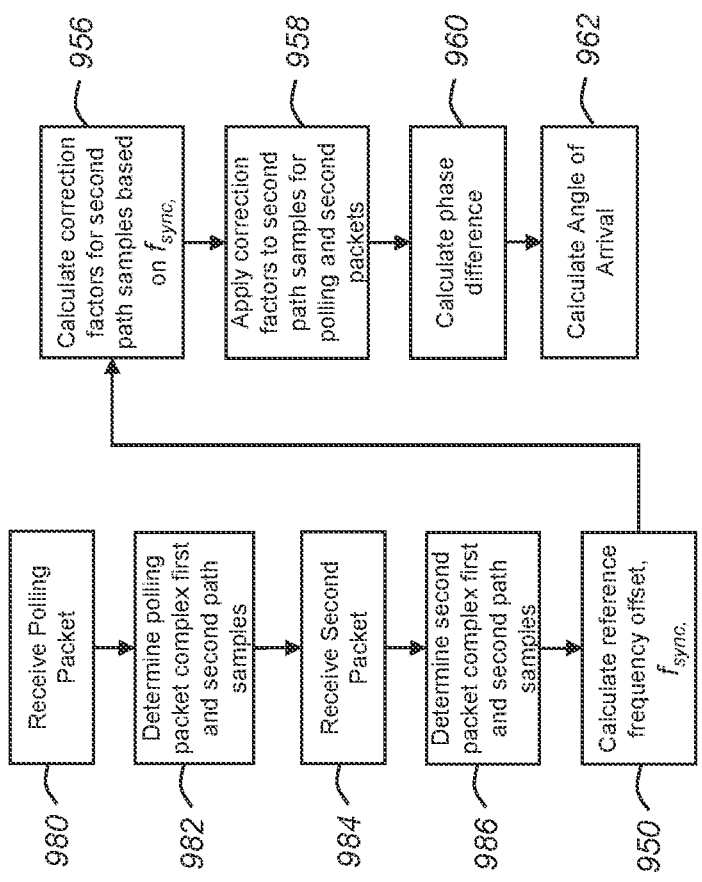
FIG. 9 illustrates a further process of a transceiver receiving a polling packet and a second packet and determining the angle of arrival based on both packets according to an embodiment of the present disclosure.

FIG. 9 illustrates a further process of a receive path receiving the polling packet and second packet and using both packets as angle of arrival packets according to an embodiment of the present disclosure. Steps of the process of FIG. 9 that also occur in FIG. 8 have been given corresponding reference numbers in the 900 series and will not necessarily be described again here.

A first step 980 comprises receiving the polling packet from the second transceiver. A second step 982 comprises determining complex first and second path samples for a respective first portion and second portions of the polling packet as described above in relation to FIG. 3.

A third step 984 comprises receiving the second packet from the second transceiver. A fourth step 986 comprises determining complex first and second path samples for a respective first portion and second portions of the second packet as described above in relation to FIG. 3.

A fifth step 950 comprises determining the reference frequency offset, $f_{sync}$, based on the transmission and receipt times of the polling packet and the second packet, and the nominal carrier frequency (as described above in relation to FIG. 10 and equation 10).

A sixth step 956 comprises determining correction factors to apply to the second complex path samples (or second CIRs) for each of the polling packet and second packet, based on the reference frequency offset, $f_{sync}$, and the carrier frequency offset estimated by the tracking loop in respective second and fourth steps 982, 984 and as described above in relation to equation 16.

A seventh step 958 comprises applying the correction factors to the second complex path samples of each of the polling packet and the second packet. An eighth step 960 comprises calculating the phase difference between the first and second complex path samples for each of the polling packet and second packet and a ninth step 962 comprises calculating a corresponding angle of arrival. It will be appreciated that an average value may be determined for the phase difference or the angle of arrival of the corresponding values determined for the polling packet and the second packet.

Figure 11:
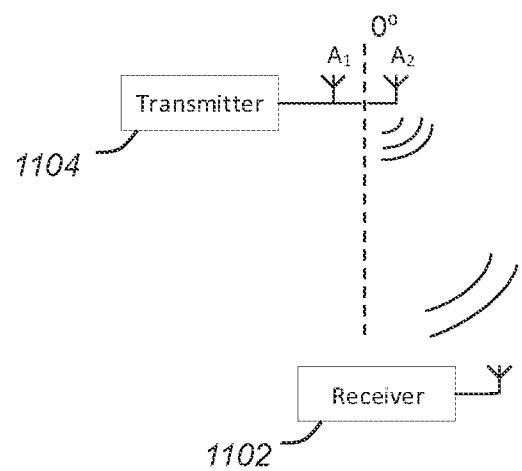
FIG. 11 illustrates a two-antenna second transceiver and a one antenna transceiver according to an embodiment.

It will be understood that the receive path may receive the first and second portion of the packets from either: (i) respective first and second receive antennas coupled to the transceiver that both receive the AoA packet from the second transceiver (see FIGS. 1 and 2); or (ii) respective first and second transmit antennas coupled to the second transceiver that transmits the AoA packet to the transceiver, as illustrated in FIG. 11. In other words, the antenna switching can occur on both the transmit-side and the receive side.

Antenna switching at the receive side can be understood by the description above and the receive path can switch coupling between the antennas to coincide with the freezing of the tracking loop. In this way, the receive path can be configured to receive the first portion of the packet from a first receive antenna and the second portion of the packet from a second receive antenna. The transceiver comprising the receive path and the first and second receive antenna may be configured to switch a coupling of the receive path from the first receive antenna to the second receive antenna. The transceiver may be configured to switch the coupling between the first portion of the packet and the second portion of the packet. The transceiver may be configured to switch the coupling in response to disabling of the tracking module.

Turning to the two-antenna second transceiver configuration of FIG. 11, the antenna switching occurs at the second transceiver 1104. The second transceiver comprises a first transmit antenna, A1, and a second transmit antenna, A2. Referring to the UWB packet configuration as an example, the second transceiver 1104 can switch antennas during or after the SFD. In this way, the first antenna transmits the synchronization field and the SFD field as a first portion and the second antenna transmits the STS field as a second portion. In this way, the transceiver 1102 comprises a receive path configured to receive a first portion of a packet (sync+SFD) from the first transmit antenna and a second portion of a packet (STS) from the second transmit antenna. In this example, the transceiver 1102 comprises a single antenna and therefore does not have to do any antenna switching. However, the receive path still freezes the tracking loop prior to receiving the second portion and applies the correction factor as described above. Therefore, the only difference to a system with two receive antennas and one transmit antenna is that the antenna switching occurs at the second transceiver. The receive path is functionally the same. Therefore, the disclosed receive path can advantageously provide AoA determination at a transceiver with only one antenna.

Figure 12:
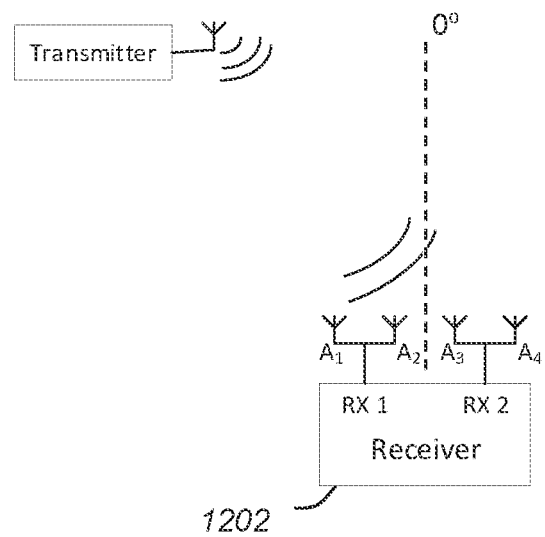
FIG. 12 illustrates an example transceiver system comprising first and second receive paths according to an embodiment of the present disclosure.

In one or more examples, there may be provide a transceiver system comprising multiple physical receive paths where each receive path is configured to receive different portions of a packet from different antennas. FIG. 12 illustrates an example transceiver system 1202 comprising first and second receive paths, RX1, RX2, according to an embodiment of the present disclosure. In this example, each receive path, RX1, RX2, is coupled to two respective receive antennas.

Both the first and second receive paths commence signal detection at the same time with each receive path coupled to one of its antennas, e.g. the first receive path uses a first antenna and the second receive path uses a third antenna. In some examples, the receive path that detects a signal first, will become a master receive path and assume responsibility for carrier frequency offset estimation and the carrier correction. The tracking loop of the other receive path may be disabled. The other receive path then applies the same carrier frequency and phase correction in order to keep the phase relationship between the two receive paths. Both the first and second receive paths integrate a first portion (e.g. synchronization field) of the packet for estimation of a corresponding synchronization CIR. Both receive paths switch the antenna, i.e. the first receive path uses a second antenna and the second receive path uses a fourth antenna to receive the second portion. The tracking loop of the master receive path is disabled prior to receiving the second portion. Both the first and second receive paths estimate the second CIR. In this way, a total of four complex phase samples is available and can be used for angle of arrival estimation. Depending on the antenna locations, the four phase values can be used for e.g. 3-D angle estimation (azimuth and elevation).

The correction factor, $S_{corr}$, as described above can be applied to the two complex path samples of the second CIRs in the same way as described above for a single receive path. For the correction factor calculation, the carrier frequency offset estimation of the receive path that detected the signal and controls the carrier correction can be used.

The disclosed receive paths and transceiver systems can provide an estimation of angle of arrival in the time-domain in a system where the number of physical receive chains is smaller than the number of antennas. In addition, the estimation procedure can advantageously tolerate large carrier frequency offsets and is limited only by the transceiver performance.

This disclosed receive paths and transceiver systems can provide estimation of angle of arrival in an UWB system in the time-domain. A number of physical receive paths can be less than the number of receive antennas. The receive path can be incorporated into existing ranging systems to provide angle of arrival as additional input for a localization engine.

The disclosed receive paths and transceiver systems allow estimation of the angle of arrival (direction of arrival) for an Ultra-Wideband (UWB) transceiver from a received UWB packet in case the number of physical receive paths is less than the number of receive antennas. The estimation can be provided in the time domain not requiring any Fourier transform and also works reliably when a carrier frequency offset between transceiver and second transceiver is present.

The angle of arrival estimation can be based upon a transceiver structure in which it is assumed that the carrier phase error of the received signal is corrected before the correlation. The corrected signal can be correlated and a complex channel impulse response (CIR) estimated by integration of the correlated signal. At least two CIRs can be estimated from different antennas which are active during different periods of the received UWB packet. Not all antennas are actively receiving all the time, i.e. the antennas are switched during reception.

From the complex CIRs, the first path samples can be determined using a first path detection algorithm. From the first path samples the phases of the carrier can be determined and the phase difference of arrival calculated. With the phase difference the angle of arrival can be estimated. Due to the antenna switching and the fact that the number of physical receive paths is less than the number of antennas, a correction of the estimated phase values may be applied.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver for calculating an angle of arrival of received signaling, the transceiver configured to:
receive a polling packet from a second transceiver, the polling packet indicating a polling packet transmission time;
transmit a response packet to the second transceiver in response to receiving the polling packet;
receive a second packet from the second transceiver following transmission of the response packet, the second packet indicating a second packet transmission time;
determine a reference frequency offset between a local oscillator of the transceiver and a local oscillator of the second transceiver based on the polling packet transmission time, a polling packet arrival time, the second packet transmission time and a second packet arrival time, and a nominal carrier frequency;
wherein the transceiver comprises a receive path configured to:
receive a first portion of an angle of arrival packet of the received signaling from a first antenna;
enable a tracking module to determine a first frequency offset and/or a first phase offset of the first portion;
correct the first portion based on the first frequency offset and/or the first phase offset to provide a first corrected signal;
determine a first carrier phase based on the first corrected signal;
disable the tracking module;
receive a second portion of the angle of arrival packet of the received signaling from a second antenna;
correct the second portion based on the first frequency offset and/or the first phase offset to provide a second corrected signal;
determine a second carrier phase based on the second corrected signal and the reference frequency offset; and
determine an angle of arrival of the angle of arrival packet based on the first carrier phase and the second carrier phase.

2. The transceiver of claim 1, wherein the angle of arrival packet comprises the polling packet or the second packet.

3. The transceiver of claim 1, wherein the transceiver is configured to determine the reference frequency offset based on a difference between the second packet transmission time and the polling packet transmission time, divided by a difference between the second packet receipt time and the polling packet receipt time.

4. The transceiver of claim 1, wherein:
the transceiver is configured to measure the polling packet receipt time and the second packet receipt time with respect to the local oscillator of the transceiver; and
the polling packet transmission time and the second packet transmission time indicated in the respective polling packet and second packet, comprise times measured with respect to the local oscillator of the second transceiver.

5. The transceiver of claim 1, further configured to transmit the reference frequency offset to the second transceiver.

6. The transceiver of claim 1, wherein the receive path is configured to:
correlate each of the first corrected signal and the second corrected signal with an expected code sequence to provide a first correlated signal and a second correlated signal respectively; and
determine the first carrier phase based on the first correlated signal and determine the second carrier phase based on the second correlated signal and the reference frequency offset.

7. The transceiver of claim 6, wherein the receive path is configured to:
determine a first channel impulse response, CIR, based on the first correlated signal and a second CIR based on the second correlated signal;
determine a first path sample based on the first CIR a second path sample based on the second CIR; and
determine the first carrier phase based on the first path sample and determine the second carrier phase based on the second path sample and the reference frequency offset.

8. The transceiver of claim 1, wherein the receive path is configured to:
determine a residual frequency offset error of the tracking module based on a difference between the first frequency offset and the reference frequency offset;
determine a phase correction factor based on the residual frequency error; and
determine the second carrier phase based on the second corrected signal and the phase correction factor.

9. The transceiver of claim 1, wherein:
the receive path is configured to adjust a frequency of an analog front end by the reference carrier frequency offset; and
the tracking module is configured to determine a residual frequency offset error as the first frequency offset.

10. The transceiver of claim 1, configured to receive the first portion of the packet from a first receive antenna of the transceiver coupled to
the receive path and receive the second portion of the packet from a second receive antenna of the transceiver coupled to the receive path.

11. The transceiver of claim 10, configured to switch a coupling of the receive path from the first antenna to the second antenna prior to receipt of the second portion of the packet.

12. The transceiver of claim 1, configured to receive the first portion of the packet from a first transmit antenna of the second transceiver configured to transmit the packet and receive the second portion of the packet from a second transmit antenna of the second transceiver.

13. The transceiver of claim 1 comprising one or more further receive paths each configured to receive the first portion and the second portion of the angle of arrival packet from corresponding further antenna pairs.

14. The transceiver of claim 1, wherein the transceiver is an ultra-wideband transceiver.

15. A method for calculating an angle of arrival of received signaling at a transceiver, comprising:
receiving a polling packet from a second transceiver, the polling packet indicating a polling packet transmission time;
transmitting a response packet to the second transceiver in response to receiving the polling packet;
receiving a second packet from the second transceiver following transmission of the response packet, the second packet indicating a second packet transmission time;
determining a reference frequency offset between a local oscillator of the transceiver and a local oscillator of the second transceiver based on the polling packet transmission time, a polling packet arrival time, the second packet transmission time and a second packet arrival time, and a nominal carrier frequency;

receiving a first portion of an angle of arrival packet of the received signaling from a first antenna;

enabling a tracking module to determine a first frequency offset and/or a first phase offset of the first portion;

correcting the first portion based on the first frequency offset and/or the first phase offset to provide a first corrected signal;

determining a first carrier phase based on the first corrected signal;

disabling the tracking module;

receiving a second portion of the angle of arrival packet of the received signaling from a second antenna;

correcting the second portion based on the first frequency offset and/or the first phase offset to provide a second corrected signal;

determining a second carrier phase based on the second corrected signal and the reference frequency offset; and determining an angle of arrival of the angle of arrival packet based on the first carrier phase and the second carrier phase.

16. The transceiver of claim 2, wherein the transceiver is configured to determine the reference frequency offset based on a difference between the second packet transmission time and the polling packet transmission time, divided by a difference between the second packet receipt time and the polling packet receipt time.

17. The transceiver of claim 3, wherein:
the transceiver is configured to measure the polling packet receipt time and the second packet receipt time with respect to the local oscillator of the transceiver; and
the polling packet transmission time and the second packet transmission time indicated in the respective polling packet and second packet, comprise times measured with respect to the local oscillator of the second transceiver.

18. The transceiver of claim 3, further configured to transmit the reference frequency offset to the second transceiver.

19. The transceiver of claim 3, wherein the receive path is configured to:
correlate each of the first corrected signal and the second corrected signal with an expected code sequence to provide a first correlated signal and a second correlated signal respectively; and
determine the first carrier phase based on the first correlated signal and determine the second carrier phase based on the second correlated signal and the reference frequency offset.

20. The transceiver of claim 7, wherein the transceiver is configured to determine the reference frequency offset based on a difference between the second packet transmission time and the polling packet transmission time, divided by a difference between the second packet receipt time and the polling packet receipt time.

* * * * *